Nov. 10, 1953

D. F. McGILL 2,658,343

ROTARY PUMP AND MOTOR HYDRAULIC TRANSMISSION

Filed May 17, 1949

INVENTOR
DANIEL F. McGILL

BY *Cook and Hokermerhorn*

ATTORNEYS

Nov. 10, 1953 D. F. McGILL 2,658,343
ROTARY PUMP AND MOTOR HYDRAULIC TRANSMISSION
Filed May 17, 1949 8 Sheets-Sheet 2
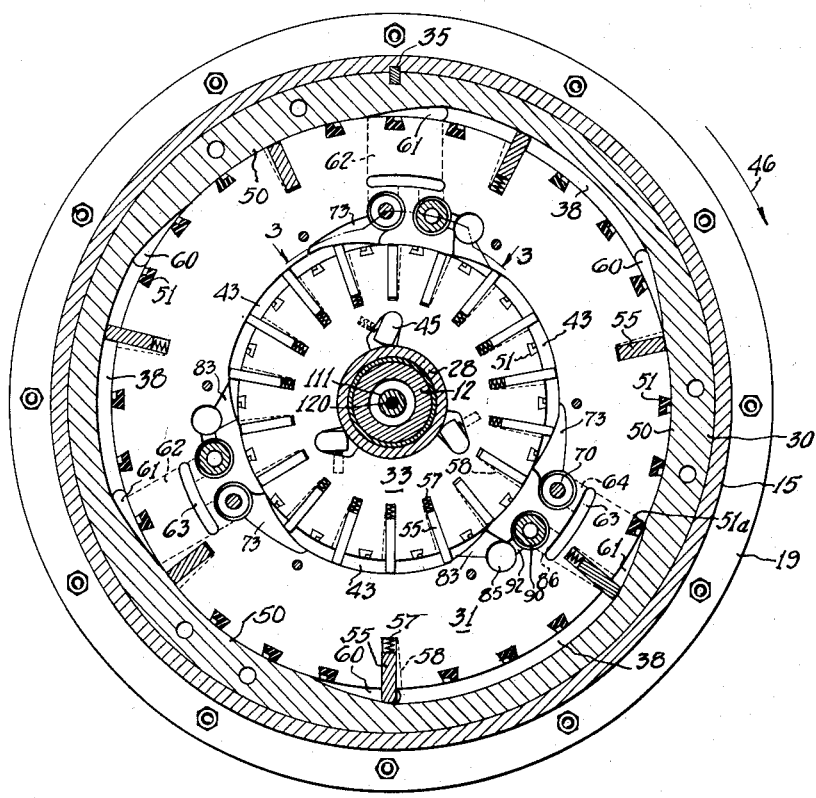
INVENTOR
DANIEL F. McGILL
ATTORNEYS

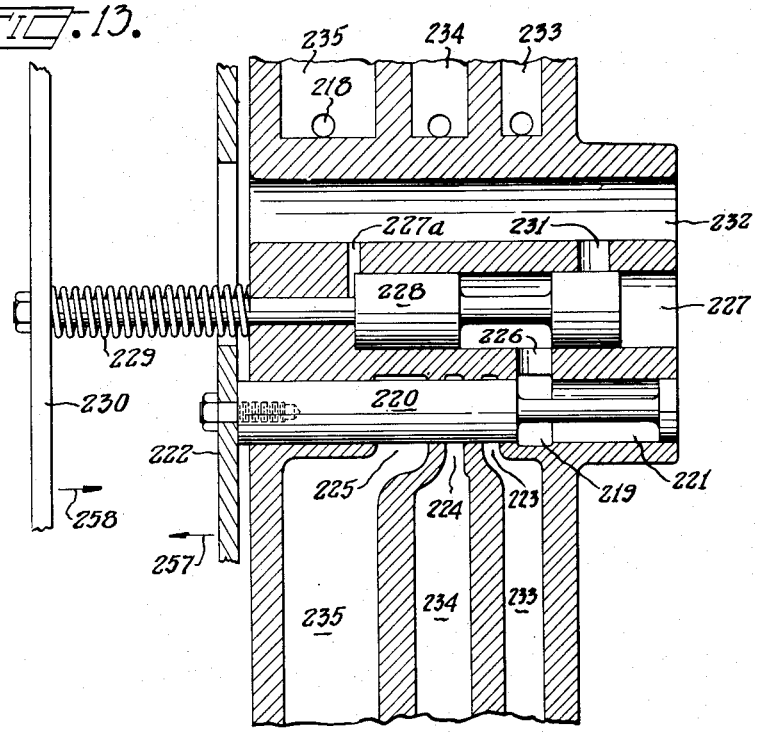
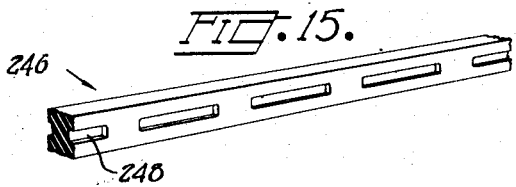
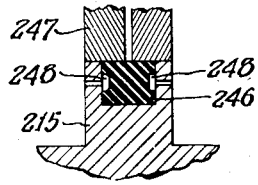
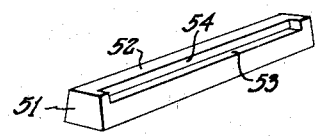
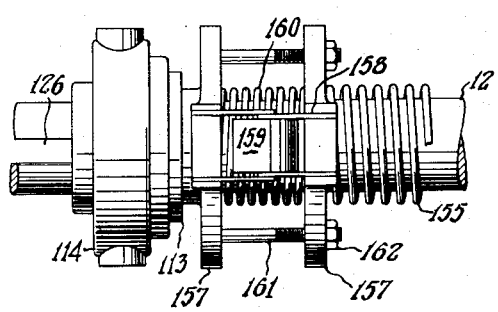

Nov. 10, 1953      D. F. McGILL      2,658,343
ROTARY PUMP AND MOTOR HYDRAULIC TRANSMISSION
Filed May 17, 1949      8 Sheets-Sheet 4
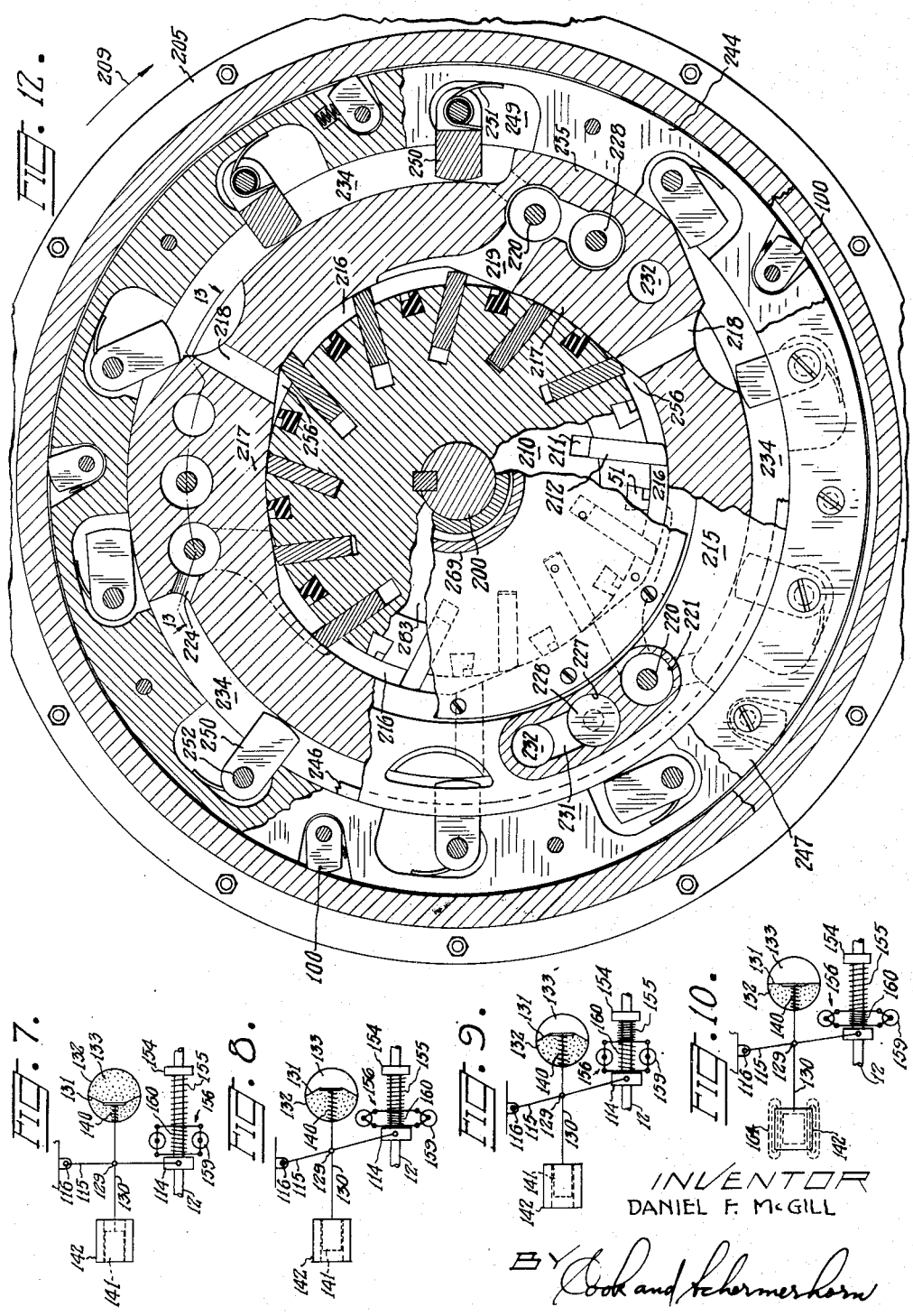
INVENTOR
DANIEL F. McGILL
BY
ATTORNEYS

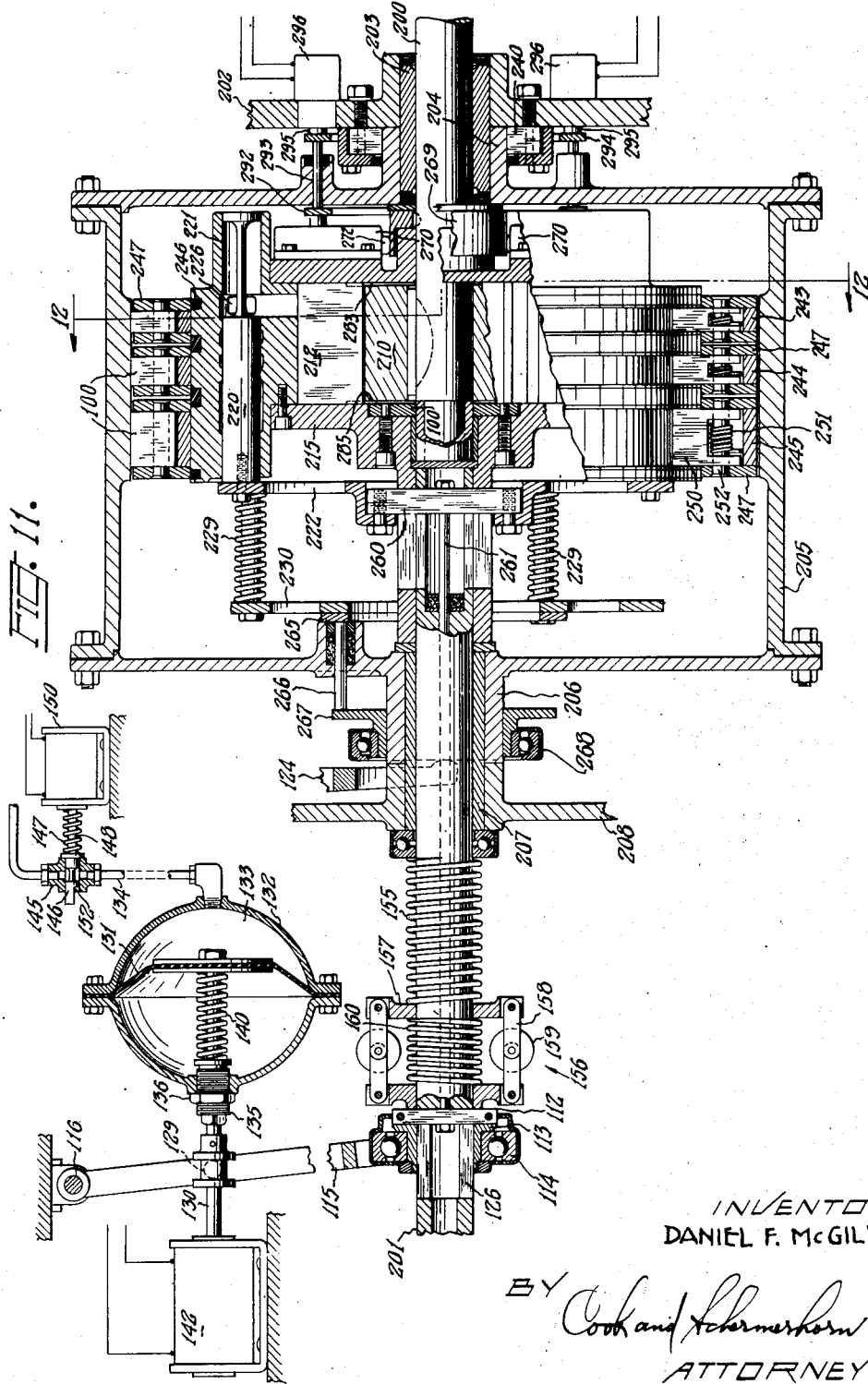

Nov. 10, 1953  D. F. McGILL  2,658,343
ROTARY PUMP AND MOTOR HYDRAULIC TRANSMISSION
Filed May 17, 1949  8 Sheets-Sheet 6
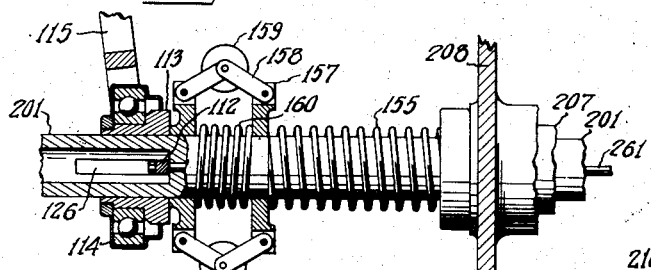
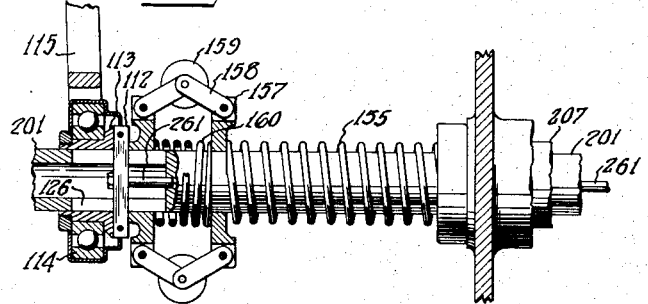
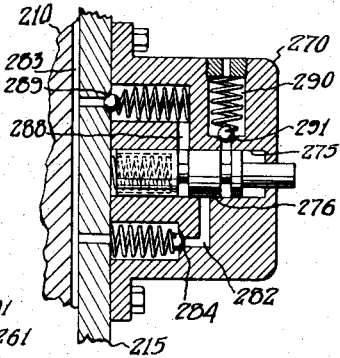
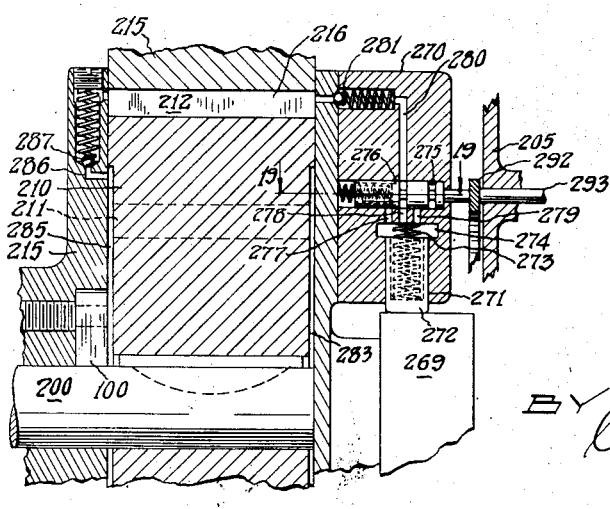
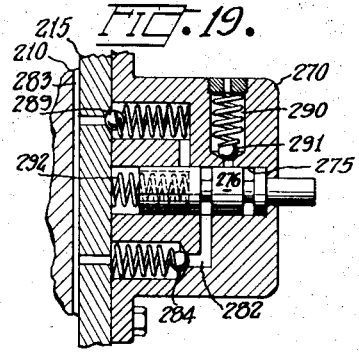
INVENTOR
DANIEL F. McGILL
BY
ATTORNEYS Nov. 10, 1953  D. F. McGILL  2,658,343
ROTARY PUMP AND MOTOR HYDRAULIC TRANSMISSION
Filed May 17, 1949  8 Sheets-Sheet 7
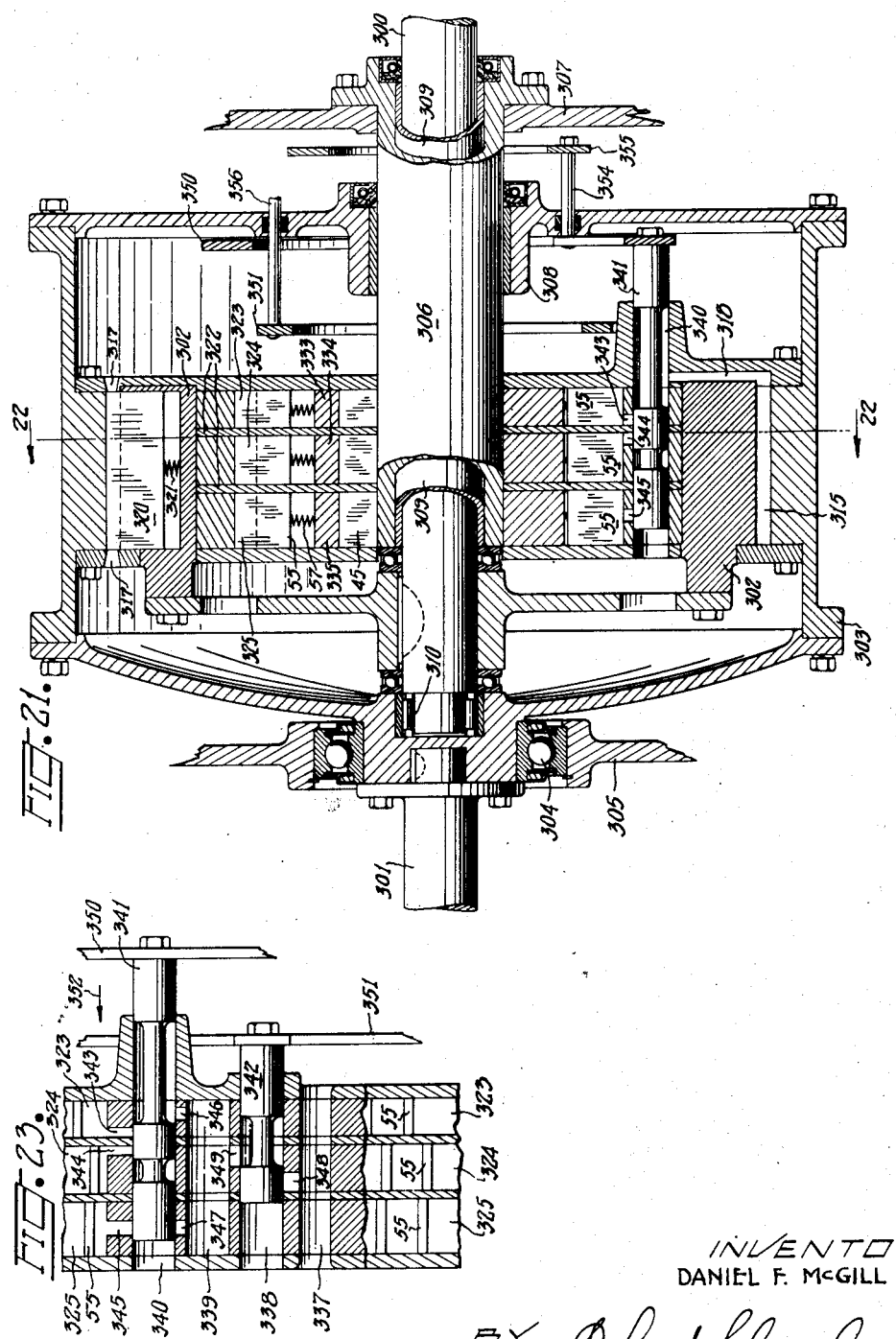
INVENTOR
DANIEL F. McGILL
BY
ATTORNEYS Nov. 10, 1953  D. F. McGILL  2,658,343
ROTARY PUMP AND MOTOR HYDRAULIC TRANSMISSION
Filed May 17, 1949  8 Sheets-Sheet 8

INVENTOR
DANIEL F. McGILL
BY
ATTORNEYS

Patented Nov. 10, 1953

2,658,343

UNITED STATES PATENT OFFICE 2,658,343
ROTARY PUMP AND MOTOR HYDRAULIC
TRANSMISSION

Daniel F. McGill, Portland, Oreg., assignor to
Donald W. Green, Portland, Oreg., as trustee Application May 17, 1949, Serial No. 93,691

17 Claims. (Cl. 60—53)

This invention relates to a transmission mechanism for transmitting power through a fluid medium from a driving shaft to a driven shaft in different speed and torque ratios.

The general objects of the invention are to provide a compact and efficient transmission which avoids the losses inherent in most conventional fluid transmissions and which is capable of transmitting power in certain definite driving ratios as well as an infinite number of other ratios.

An important object is to provide a fluid transmission in which the entire input torque of the driving member is directly applied to the driven member throughout all lower speed ratios as well as in a direct or 1 to 1 speed ratio.

Particular objects are to provide a positive displacement type of fluid transmission wherein the driving and driven shafts are positively interconnected in different driving ratios by an incompressible fluid medium without slippage, and to provide a positive displacement fluid transmission having reaction members mounted concentrically with driving and driven members to rotate as a unit with the driving and driven members in direct drive without any relative movement between the different parts of the transmission and without any pumping of fluid therein. Another object is to provide a transmission of the type described in which different ranges of driving ratios, and direct drive, are established by operation of a novel valve mechanism which selectively controls or prevents the circulation of the transmission fluid, and in which the actual torque ratio at any instant may adjust itself automatically in response to the load, within the limits of the range of ratios determined by the position of the valve mechanism. Another object is to provide a transmission having a variable displacement component with a plurality of reaction chambers which may be included in the fluid circuit in variable number to apply torque to the driven member in addition to the torque applied directly by the driving member.

Further objects art to provide a transmission mechanism of the type described in which the desired torque may be transmitted without building up excessive fluid pressures to provide a mechanical design in which the outer sealing means are not subjected to the fluid pumping pressures in the transmission, and to provide novel and improved sealing means for the rotary parts within the transmission.

A still further object is to provide an automatic control mechanism for use on an automotive vehicle or other application involving an internal combustion engine for changing the driving ratios of the transmission under the different conditions encountered in use to effect an entirely automatic transmission.

Three embodiments of the transmission are disclosed. In each embodiment there is a driving member, a driven member and a plurality of reaction members, all rotatably mounted and concentrically arranged so that the outermost member serves as an external housing for the transmission and a reservoir to contain the transmission fluid. Direct drive is effected by closing a control or ratio valve to prevent fluid circulation within the transmission so that all the members are caused to rotate in unison to establish in effect a direct mechanical connection between the driving and driven shafts, although in reality the connection is not mechanical but a hydraulic lock through the medium of the incompressible fluid in the transmission, which is preferably a suitable oil.

The driving and driven members in each embodiment cooperate to form a positive displacement pump component, the outlet of the pump chambers being through said control or ratio valve. Hence, as long as the ratio valve remains closed, fluid cannot discharge from the pump chambers and the pump members comprising the driving member and driven member of the transmission cannot move relatively to each other, but are locked hydraulically together so that they can turn only in unison.

The ratio valve is arranged to open a series of ports in succession as it is moved away from its closed position, and when it is opened to permit discharge of fluid from the pump chambers, the driving member may then turn relative to the driven member according to the rate at which fluid is allowed to escape from the pump chambers. The different ports of the ratio valve admit the fluid from the pump component into separate chambers which may act as positive displacement motor chambers of a fluid motor or reaction component to increase the torque applied to the driven member in accordance with the pressures developed and the additional piston areas exposed to such pressures. When the ratio valve is moved to admit fluid to all of the motor chambers through wide open ports, the motor component is then operating at its maximum displacement and pressure to provide the lowest speed, highest torque, driving ratio. In certain intermediate positions of the ratio valve, only a part of all the working chambers of the motor component are included in the fluid circuit to effect one or more definite intermediate driving ratios.

In other valve positions, when the fluid flow is throttled through some of the ports to reduce the pressure in the motor chambers, an infinite number of ratios is possible, to provide smooth performance through a wide range of speeds and torques, and the manner in which this is accomplished in a positive displacement device constitutes an important feature of the invention. Depending upon the valve position and operating conditions, the pressures in the reaction chambers may vary from a vacuum condition up to the pump chamber pressure to afford a novel type of automatic load response and ratio control, which will be described in detail in connection with the different illustrated embodiments of the invention. The parts are so arranged that even in a speed ratio lower than 1 to 1 the entire input torque is always applied directly to the driven member.

In the preferred embodiment first illustrated on the drawings, the driving member is outermost and forms the transmission housing and fluid reservoir, while the other embodiments disclose alternative arrangements in which the driving member may be either centrally disposed or interposed between the driven and reaction members. For certain applications the control or ratio valve may be actuated manually but in the present embodiments, for use with an internal combustion engine, automatic control mechanism is provided for this valve comprising springs, a speed responsive governor on the driven shaft and a pressure responsive diaphragm connected with the intake manifold of the engine.

The present transmission is intended only for unidirectional rotation. Where reverse rotation is also necessary, a reverse gear having a manual shifting lever is interposed in the driven shaft.

These and other objects and advantages of the invention will be apparent and the invention will be better understood from the following description with reference to the embodiments illustrated on the accompanying drawings. It is to be understood that various changes may be made in the construction and arrangement of parts and that certain parts may be used without others.

In the drawings:

Figure 2 is a cross sectional view taken on the line 2—2 of Figure 1;

Figure 3 is a fragmentary sectional view through the valve mechanism taken on the line 3—3 of Figure 2;

Figure 4 is a fragmentary sectional view of one of the radial blades shown in Figure 2;

Figure 5 is a perspective view of one of the longitudinal resilient sealing members shown in Figure 2;

Figure 6 is a top plan view of the centrifugal governor device shown in Figures 1 and 11;

Figure 7 is a diagram showing the control mechanism of Figures 1 and 11 in rest position;

Figure 8 is a diagram showing the control mechanism in direct drive at normal speed;

Figure 9 is a diagram showing the control mechanism in idling position or direct drive at low speed;

Figure 10 is a diagram showing how the control mechanism is shifted into ratio position at normal speeds by solenoid operation;

Figure 11 is a longitudinal sectional view of a second embodiment of the invention in which the innermost member is the driving member and the intermediate member is the driven member;

Figure 12 is a cross sectional view taken on the line 12—12 of Figure 11;

Figure 13 is an enlarged fragmentary sectional view of the ratio and neutral valves taken on line 13—13 of Figure 12;

Figure 14 is an enlarged fragmentary sectional view of one of the annular sealing rings shown in Figure 11;

Figure 15 is a perspective view of a portion of the sealing ring shown in Figure 14;

Figure 16 is a fragmentary view showing the centrifugal governor device and ratio control lever of Figure 11 at normal, or high, speeds in direct drive, corresponding to the diagram in Figure 8;

Figure 17 shows the ratio lever drawn back out of direct drive position by operation of the solenoid as in Figure 10;

Figure 18 is an enlarged sectional view of the driving member and auxiliary pump shown in Figure 11;

Figure 19 is an enlarged sectional view of the auxiliary pump valve taken on the line 19—19 of Figure 18;

Figure 20 is a view corresponding to Figure 19 showing the valve in a different position;

Figure 21 is a longitudinal sectional view of a third embodiment of the invention in which the intermediate member is the driving member and the outer member is the driven member;

Figure 23 is a fragmentary sectional view taken on the line 23—23 of Figure 22, showing the ratio and neutral valves.

In its three different forms the invention is embodied in an automatic transmission for use in an automobile to take the place of the conventional clutch and sliding gear transmission. Suitable control means are disclosed to adapt the transmission to the special needs of automotive use, but it will be readily apparent to persons skilled in the art that the transmission is capable of general application, and that other suitable automatic control means or manual control means may be applied to the transmission.

Figure 1:
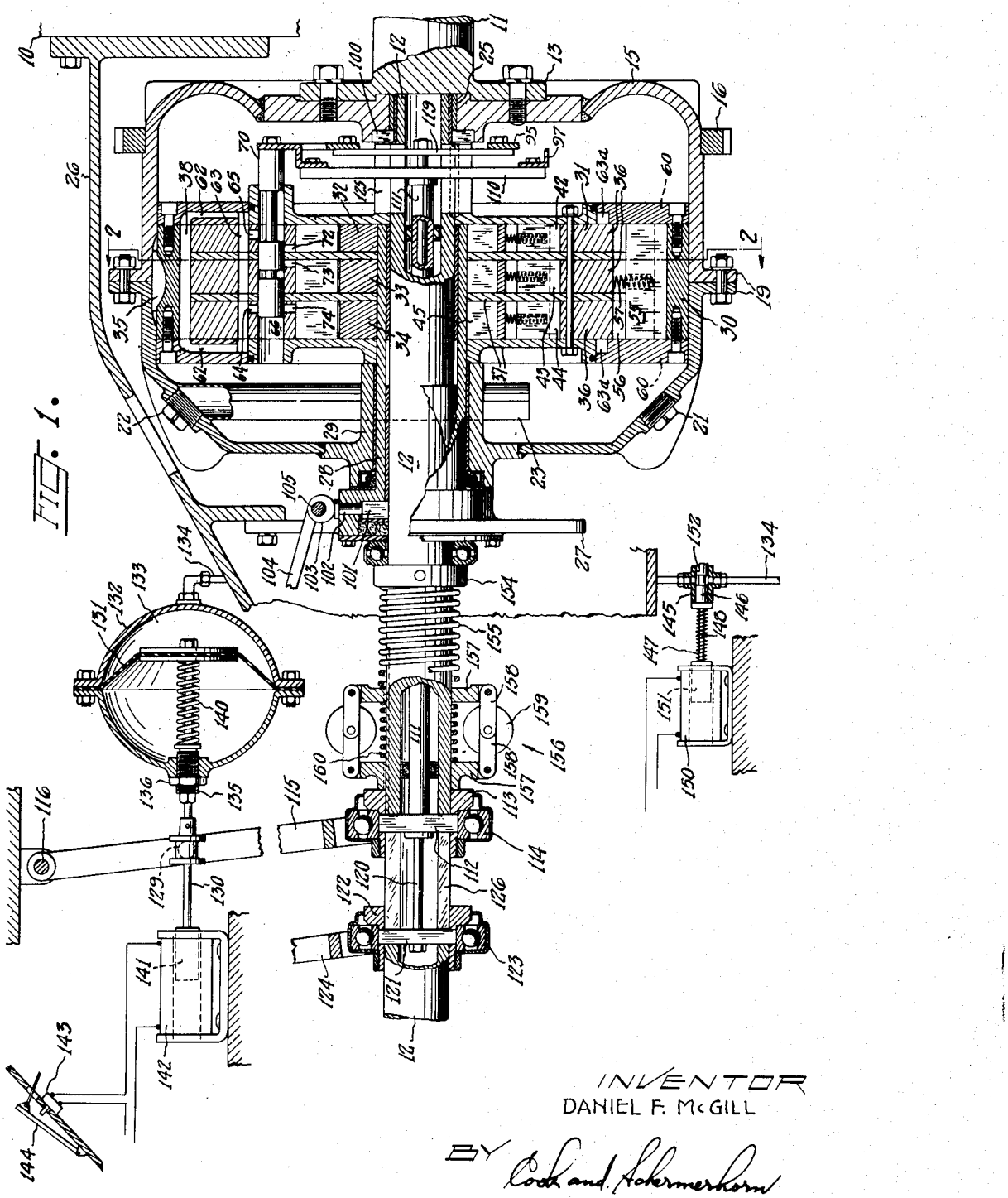
Figure 1 is a longitudinal sectional view of a preferred embodiment of the invention in which the outer member is the driving member and the intermediate member is the driven member, this view also including control mechanism to make the transmission fully automatic for use in an automobile.

*Preferred embodiment of Figures 1 and 2*

In Figure 1 the numeral 10 designates the rear end of the block or other stationary part of the internal combustion engine of an automobile, and the numeral 11 the crank shaft of the engine. The numeral 12 designates the driven shaft of the vehicle whereby in reference to the present transmission the shaft 11 is the driving shaft and the shaft 12, which is in axial alignment therewith, is the driven shaft. The crank shaft or driving shaft 11 is equipped with a flange 13 which is bolted to the driving member 15 of the transmission, and this driving member is equipped with a ring gear 16 of the type which is usually mounted on the engine flywheel to be engaged by the pinion gear on the starting motor. The driving member 15 is preferably made in two parts having mating flanges 19 which may be bolted tightly together to form a rotatable housing and fluid reservoir for the transmission, and this housing may serve as the flywheel for the engine.

The housing 15 is equipped with a drain plug 21 and a filler plug 22. A filler tube 23 extends into the housing a depth from the filler opening to establish the proper liquid level in the housing when it is filled. When the filler opening is uppermost, as shown in Figure 1, the lower end of the tube 23 preferably extends some distance below the axis of the housing so that the trapped air above this level will occupy substantially more than half the free space in the housing. The transmission requires a relatively small amount of liquid in the reservoir, which liquid is distributed around the periphery of the housing in a ring of uniform depth as long as the crank shaft 11 is rotating.

The forward end wall of the housing 15 adjacent the crank shaft flange 13 contains a bearing 25 to support the forward end of the driven shaft 12. Secured to the engine 10 is a stationary housing 26 carrying a plate 27 which has a sleeve 28 surrounding the driven shaft 12 and extending into the rear end of housing 15 through a bearing hub 29.

The principal parts of the transmission in relation to the fluid medium comprise an annular member 30 secured to the housing 15 and forming an integral part of the driving member, a driven member 31 secured to the driven shaft 12, and three separate reaction members 32, 33 and 34. The member 30 is fixed to the housing 15 by means of a key 35 or suitable splines and may be considered as the driving member of a fluid pump. Driven member 31 comprises three rings or annular parts 36 clamped between four radial plates 37 as shown in Figure 1. These rings and plates form a cylindrical surface on their outer periphery to have a rotating fit within the driving member 30 which has cavities defining three chambers 38 around the driven member 31. The chambers 38 are designated as pump chambers because upon relative rotation of the driving and driven members fluid from the reservoir of the transmission housing is drawn into these chambers and pumped out under a working pressure.

Within the rings 36 the plates 37 define additional sets of chambers referred to as motor chambers because they may be connected to receive the fluid pumped from the pump chambers to drive the driven member. Between the front end plate 37 and the next intermediate plate 37, there are three motor chambers 42 disposed symmetrically around the interior of the driven member. The two intermediate plates 37 constitute partitions enclosing a central set of three motor chambers 43, and one of these plates and the rear end plate 37 constitute end walls for another set of motor chambers 44. These motor chambers comprise cavities in the rings 36, as shown in Figure 2 in the case of the central chambers 43.

Each space between the plates 37 contains one of the reaction members 32, 33 and 34, the reaction member 33 being shown in Figure 2. The reaction members 32 and 34, and the chambers 42 and 44 in which they operate, do not appear in Figure 2. Each of the reaction members 32, 33 and 34 is provided with a set of spring biased one-way brake dogs or wedges 45 engageable with stationary sleeve 28 to permit free rotation of that reaction member in the direction of arrow 46 and prevent reverse rotation whereby some of the reaction members may rotate while others remain stationary under certain working conditions of the transmission. The arrow 46 in Figure 2 designates the direction of rotation of all the rotatable parts of the transmission. This direction will be referred to as the forward direction. No part of the transmission turns counter to this direction.

Between the cavities in the driving member 30 which form the three pump chambers 38 between this member and driven member 31, the driving member has three fluid abutments 50 extending inwardly to make a rotating fit with the outer periphery of the driven member 31 and form partitions between the pump chambers. The outer periphery of driven member 31 is slotted longitudinally to receive a plurality of seals 51 arranged to prevent leakage from one chamber 38 to the next between the driving and driven members. The specific form of these sealing members is shown in Figure 5. Each seal 51 is molded of a suitable resilient material which will not deteriorate in the presence of hot oil. The seal is in the form of a bar having a wide base to fit in a wedge-shaped slot with its upper edge surface or lip 52 flush with the surface of the driven member. Below the top surface 52 there is a step surface 53 and a vertical surface 54 having a combined area greater than the rubbing area of surface 52.

When these surfaces of the seal are exposed to fluid pressure in the chambers 38, the pressure acting on the greater area of surfaces 53 and 54 tends to compress the body of the material against the bottom and side walls of the slot, causing the surface 52 to rise and project slightly above the surface of the driven member. Hence, the surface 52 under such conditions will engage the arcuate inner surface of the partitions 50, the sealing effect being greater under greater pressure. When the pressure in chambers 38 is reduced, the seals 51 return to their original relaxed shapes in which they have only light contact with the partitions 50. With the use of such seals, the sealing pressure and drag on the parts never exceeds the value necessary to prevent leakage, and the abutment partitions 50 can be made relatively short, thereby allowing for the three pump chambers without requiring the ramp surfaces to slope too abruptly.

Driven member 31 also carries a plurality of radial blades 55 mounted in slots 56 as shown in Figure 4. Springs 57 urge the blades outwardly into light contact with the interior surface of driving member 30 to follow the contours of chambers 38 and partitions 50. One wall of each slot 56 on the pressure side of the block contains a groove 58 to communicate chamber pressure to the bottom of the blade slot to assist the spring 57 in extending the blade out of the slot when the chambers 38 are under pressure. This arrangement will produce an outward bias on each blade proportional to chamber pressure, because the full chamber pressure is effective over the full area of the bottom of the blade, whereas it is not effective over the whole area of the outer end of the blade. When the pressure is reduced in the chambers 38, the fluid pressure bias on the blades is also reduced to avoid unnecessary friction and wear. The springs 57 need only be strong enough to extend the blades.

When the driving member 15, 30 rotates in the direction of arrow 46 relative to driven member 31, it will be apparent that the effect is the same as rotating member 31 as a pump rotor in the reverse direction, causing the blades to sweep through the chambers 38 to draw in fluid through inlet ports 60 and discharge it under pressure through outlet ports 61. It will be observed that as a partition 50 encounters a seal, such as the seal 51a in Figure 2, the seal surfaces 53 and 54 remain in contact with the chamber pressure to raise the lip surface 52 out of the slot and into sealing engagement with the arcuate surface of partition 50, so that the blades 55 are not required to bear against the partition surfaces with sufficient force to make an effective seal themselves. It will also be apparent that the source of pressure is removed from each groove 58 as soon as the trailing side of outlet port 61 starts to pass the blade, whereby the fluid pressure acting radially inwardly on the outer end of the blade becomes effective to retract the blade partially, or at least to reduce its rubbing pressure and reduce friction on the surfaces of partitions 50.

Fluid forced out of each outlet port 61 by the relative rotation of driving member 30 and driven member 31 flows through radial passages 62 and circular channel 63a to a longitudinal passage 63 having ports 64 and 65 leading to the longitudinal cylinder 66 of a balanced piston valve 70. This valve is designated as a ratio valve because it operates to control the driving ratio of the transmission. In Figure 3, the ports 64 and 65 do not appear in the plane of the view, but the relative longitudinal positions of these ports are indicated by dotted lines. Ports 72, 73 and 74 establish communication between the valve cylinder 66 and the respective motor chambers 42, 43 and 44 associated with the reaction members 32, 33 and 34. There are three valve assemblies identical with the valve assembly shown in Figure 3.

Each reaction member is equipped with resilient seals 51 and blades 55 which operate in the same manner as the blades and seals in driven member 31 hereinabove described.

In Figures 2 and 3 the ratio or piston valve 70 is shown at its limit of forward travel in which the ports 64, 72, 73 and 74 are closed, the port 65 being open but cut off from communication with any other port. In this position of the valve 70 it is apparent that fluid cannot be discharged from the outlet ports 61 in the pump chambers 38, and hence, since the fluid is an incompressible medium, the driving member 30 cannot rotate relative to the driven member 31. The ratio valve 70 is thereby effective in its Figure 1 and 3 positions to lock hydraulically the driven member 31 to the driven member 15, 30 and establish the equivalent of a direct mechanical connection between the drive shaft and driven shaft, although, in fact, the transmission fluid confined in the pump chambers 38 constitutes one link of this connection.

When the ratio valve 70 in Figure 3 is moved rearwardly, in the direction of arrow 75, the port 72 to a motor chamber 42 is opened and placed in communication with port 65. In a similar manner, each of the other two pump chambers 42, has an inlet port 72 communicating with one of the other two valve cylinders 66. Fluid delivered under pressure through inlet ports 72 reacts against the blades 55 in reaction member 32, tending to rotate the reaction member in a reverse direction, which rotation is prevented by the one-way brake elements 45. Hence, as fluid is pumped into the chambers 42, the driven member 31 which, in effect, forms the casing for these chambers, is driven forward in the direction of arrow 46 by an additional force depending upon the pressure developed in chambers 42.

When the piston valve 70 is moved rearwardly a greater amount, it uncovers ports 73 in addition to ports 72, so that fluid delivered from the pump chambers 38 is allowed to enter the three motor chambers 43 as well as the three motor chambers 42. The displacement or volumetric capacity of the total number of motor chambers in the fluid circuit is thereby increased accordingly, and the driving force exerted on the driven member is increased in accordance with the pressure developed in chambers 43. The fluid flow from pump chambers 38 to motor chambers 43 can be traced directly in Figure 2, which is a sectional view showing the central reaction member 33 and central motor chambers 43, it being remembered that fluid is also being delivered at the same time through parallel ports and passages to the motor chambers 42.

When the piston valve 70 is moved to its rearmost position, the ports 65, 72 and 73 remain open to continue supplying the motor chambers 42 and 43 and, in addition, ports 64 and 74 are uncovered to supply the third set of motor chambers 44 containing the reaction member 34, and apply additional driving torque to the driven member by the action of the fluid pressure in chambers 44. This condition of operation represents the lowest speed driving ratio and the highest mechanical advantage obtainable by the transmission, wherein the displacement and piston areas in the nine motor chambers 42, 43 and 44 are utilized to the fullest extent.

The drive is positive in a definite torque ratio in each of the three positions of the valve 70 in which one or more of the ports 72, 73 and 74 are wide open with no port throttled. Likewise, in direct drive, when the ratio valve 70 is in the position shown in Figures 1 and 3, there is, in effect, a definite positive driving connection in one-to-one ratio without slip between driving member 30 and driven member 31, because the fluid then cannot escape through outlet ports 61 in the pump chambers 38.

When the ports 72, 73, 74 are all closed for direct drive, the rotation of driven member 31 would tend to draw a vacuum in the motor chambers 42, 43, 44 and exert a drag on the driven member were it not possible for the reaction members to rotate in a forward direction along with the driven member. By reason of the fact that the three reaction members are independent of each other, some of these members may remain stationary while others rotate when the ratio valve is moved to intermediate positions to admit fluid to some of the motor chambers and not to others. The reaction members remain stationary only when reaction pressure is exerted thereagainst in the motor chambers to hold them stationary against their overrunning brake dogs. The motor chambers are, therefore, also referred to as reaction chambers.

When the three ports 72 are opened sufficiently to admit fluid to the motor or reaction chambers 42 fast enough to build up a pressure therein, the result of this pressure is to apply a forward driving force or torque to the driven member 31 in addition to the torque applied directly by the fluid pressure in pump chambers 38. As the pressure in the motor chambers increases, either by reason of wider opening of the ports 72 or by a tendency for the driven member to slow down under load, this additional torque increases automatically according to demand, to carry the load.

This condition may be described as a throttling or transition phase of operation wherein the additional torque obtained from a certain amount of valve opening depends chiefly upon the load on the driven member and varies with the load to effect any necessary speed change smoothly within a definite range of torque ratios. The maximum amount of torque increase is obtained from chambers 42 when the three ports 72 are wide open to maintain approximately the same pressure in chambers 42 that exists in pump chambers 38, the torque ratio then being a function of relative piston areas in the pump and motor chambers, taking into consideration the different effective radial distances of these chambers from the axis of rotation.

When the ratio valves 70 are moved farther to begin opening the three ports 73, the torque applied to the driven member is further increased by the establishment of fluid pressure in the chambers 43. This torque again increases with the reaction or motor chamber pressure through a second range of ratios. Similarly, a further gradual torque increase through a third range of ratios is obtained as the ports 74 are opened to fill and establish pressure in the chambers 44. The operation of the various reaction chambers in the manner described does not affect the direct application of torque to the driven member in one-to-one ratio which takes places in the pump chambers.

Thus, notwithstanding the existence of certain definite or fixed driving ratios, the variations in the speed and torque ratios in response to different valve positions and different load conditions are gradual throughout the entire range of the transmission to provide smooth operation under changing conditions. By providing a plurality of reaction or motor chambers which may be brought into operation in sequence the establishment of working pressures in the motor chambers is caused to occur at a plurality of different speed ratios which are convenient for the purpose. The chambers 42 may be enlarged and the chambers 43 and 44 eliminated without changing the principle of operation, but the arrangement shown is preferred as being more efficient for the present purpose.

Fluid is drawn into pump chambers 38 from the oil reservoir in housing 15 through inlet ports 60 disposed close to the periphery of this housing, so that all of these ports will be submerged in the event there is only a slight depth of fluid distributed uniformly around the housing when the latter is rotating. The fluid is returned to the reservoir through outlet ports 82, 83 and 84 having free communication with a longitudinal discharge passage 85 which opens at both ends into the reservoir space within housing 15. There is an outlet port 82 for each of the three motor chambers 42, an outlet port 83 for each of the three motor chambers 43, and an outlet port 84 for each of the three motor chambers 44. One set of these ports is shown in Figure 3, but they do not appear in Figure 1. The three outlet ports 83 appear in Figure 2.

Each longitudinal channel 63 also has ports 86 and 87 communicating with a cylinder 88 for a balanced neutral valve 90. The longitudinal positions of these ports are indicated by dotted lines in Figure 3, but, like the ports 64 and 65, these ports are above the plane of the view and do not actually appear in Figure 3. The positions of these ports are also indicated at 86 in Figure 2. When the neutral valve 90 is in its rearmost position as shown in Figure 3, the ports 86 and 87 are closed, but when the valve 90 is moved to a forward position, communication is established between these ports and other ports 92 in the wall of longitudinal passage 85. The valve has only two positions.

The three neutral valves 90 are attached to an actuating plate 95 and when this plate is moved forward in the direction of arrow 96 the output of pump chambers 38 is emptied directly into the discharge passage and returned to the housing reservoir without building up pressure in pump chambers 38 and thereby not transmitting any driving torque to driven member 31. This valve remains closed at all times when the transmission is used to drive the driven shaft 12, and is opened only to interrupt the connection between the driving and driven shafts.

The three ratio valves 70 are similarly connected with an actuating plate 97 which is movable rearwardly in the direction of arrow 75 to different positions as hereinabove described.

In some uses of this type of transmission, it may be desirable to permit overrunning of the driven shaft, but in the present installation in an automobile it is preferred to prevent such free wheeling. There are accordingly provided a set of rocking wedges or dogs 100 between the end of the driven shaft 12 and the housing 15 operable in the manner of the wedges 45 in Figure 2 to serve as an overrunning clutch between the driving and driven shafts. The dogs 100 are inclined in the same directions as the dogs 45, but, since they are carried by the driving member and react against the driven member, they permit overrunning of the driving shaft with respect to the driven shaft and prevent overrunning of the driven shaft with respect to the driving shaft. This permits the automobile to be pushed for starting and permits the engine to be utilized as a brake when the throttle is not depressed.

At the rear end of the transmission there is provided a single one-way brake dog 101 arranged to prevent reverse rotation of driven shaft 12 to prevent the vehicle from backing down a hill. This wedge device is preferably made releasable so that it will function only when desired. As shown in Figure 1, the dog 101 seats against the end of a pin 102 to function in the manner described, permitting forward rotation of shaft 12 and preventing reverse rotation. The pin 102 is held in its depressed position shown by a cam 103 connected with a lever 104 for rotation on a transverse shaft 105. In the drawing, the lobe of cam 103 is turned downwardly to depress the pin 102 to the position described. When the cam 103 is turned away from this position, the pin 102 may be readily pushed back by dog 101 which is contained in a socket of greater depth than the length of the dog so that the shaft 12 can then rotate freely in either direction. This hill holding device is a convenience for automotive use, but is not essential to the operation of the present transmission.

*Control mechanism in Figure 1*

The actuating ring 97 for ratio valve 70 is attached to a cross bar 110 on the end of an axially slidable tube 111 extending through the center of the hollow shaft 12. The rear end of this tube is connected with a cross head 112 in a ring 113. The longitudinal position of ring 113 and cross head 112 may be shifted by an outer non-rotating ring 114 which is pivotally connected with a yoke on the lower end of a shifting lever 115 in a manner well understood in the art and commonly used on clutch throw levers. The upper end of shifting lever 115 is pivotally mounted on a fixed pin 116.

Similarly, the actuating ring 95 for the neutral valve 90 is connected with a cross bar 119 on a rod 120 extending through the tube 111. The rear end of rod 120 is connected with a cross head 121 in a ring 122. The ring 122 and cross head 121 may be shifted longitudinally on the shaft 12 by means of an outer non-rotating ring 123 having pivotal connection with a yoke at the lower end of a shifting lever 124. The cross bars 110 and 119 have longitudinal travel in a transverse slot 125 extending through shaft 12 and the hub of driven member 31 within the transmission housing, and the cross heads 112 and 121 have longitudinal travel in a transverse slot 126 to the rear of the transmission housing. The bore in shaft 12 contains suitable seals to prevent escape of the transmission fluid.

The neutral lever 124 has a fixed pivot and manual operating handle, not shown. The ratio shifting lever 115 has pivotal connection at 129 with a rod 130. The forward end of the rod 130 is connected with a diaphragm 131 in a housing 132 which forms a vacuum chamber 113 in front of the diaphragm. Chamber 133 is connected with a vacuum line 134 leading to the intake manifold of the engine. An adjustable threaded bushing 135 having a lock nut 136 supports the rod 130 in the housing 132 and provides a rear stop or abutment for a diaphragm spring 140. This is a compression spring acting in conjunction with reduced pressure in chamber 133 to move the shifting lever 115 in a forward direction. Atmospheric pressure is in communication with the spring side of the diaphragm at all times, either by access through bushing 135 or through a vent in the rear side of the housing.

The rear end of rod 130 is connected with a reciprocating armature 141 in a solenoid 142. The energizing circuit for the solenoid is closed by a switch 143 associated with the foot throttle of the automobile so that this circuit is closed when the foot throttle is pressed down as far as it will go. The switch returns to open position when the throttle pressure is released and it remains open in positions of the foot throttle assumed in normal driving.

A valve 145 is connected in the vacuum line 134. This valve is a reciprocating balanced piston type valve having a piston element 146 in a cylinder in the valve body. The piston element 146 is normally extended to hold the valve open for communication through line 134 by a spring 147 acting on the piston rod or valve stem 148. The piston element 146 may be retracted against the force of spring 147 to interrupt communication through the vacuum line 134 by energizing the solenoid 150. When the solenoid is energized, armature 151 on the piston rod 148 is drawn into the solenoid to close the valve port communicating with the engine manifold. A notch 152 is provided in the piston element 146 to admit atmospheric pressure into the valve port communicating with chamber 133 when the piston element is retracted in order to balance the air pressure on opposite sides of the diaphragm. Thus, when the solenoid is energized, the diaphragm is rendered non-responsive to reduced manifold pressure.

Mounted on the shaft 12 a distance ahead of the transverse slot 126 is a collar 154. Disposed between the collar 154 and the ring 113 are a compression spring 155 and a centrifugal governor device 156. The governor device 156 comprises a pair of end plates 157 interconnected by pairs of pivotal links 158 carrying fly weights 159. A second compression spring 160 is disposed between the two plates 157, urging them apart to retract the fly weights, as shown in Figure 1, at low rotational speeds of the shaft 12. The plates 157 are both slidable longitudinally on the shaft 12, but they are constrained by splines or other means to rotate with the shaft. The maximum spacing of plates 157 under the action of spring 160 may be adjusted by a pair of bolts 161 having nuts 162, as shown in Figure 6. This adjustment determines the speed necessary to throw out the governor weights.

The arrangement is such that spring 155, which may be identified as the shaft spring or ratio spring, urges the governor assembly 156 against the ring 113, tending to shift the ring rearwardly toward ratio drive position. Governor spring 160 is preloaded between the plates 157, and is of sufficient stiffness to prevent contraction of the plates 157 toward each other by the action of spring 155 alone. The fly weights 159, however, have sufficient mass to draw the plates 157 together and compress the spring 160 to varying degrees with increasing speeds of the shaft 12 above a predetermined minimum value.

The operation of the control mechanism shown in Figure 1 will now be described under the operating conditions in a motor vehicle driven by an internal combustion engine, with reference to the diagrams in Figures 7 to 10. The dotted shading in diaphragm housing 132 indicates the presence of atmospheric pressure on one or both sides of the diaphragm, as shown. In Figures 8, 9 and 10 the absence of dotted shading in chamber 133 indicates a partial vacuum condition corresponding to the reduced pressure existing in the engine manifold under different operating conditions with the throttle valve less than wide open. In Figure 10 the dotted lines 164 represent magnetic flux to indicate that solenoid 142 is energized. The absence of flux 164 in Figures 7, 8 and 9 indicates that the solenoid is not energized.

Figure 7 shows the condition of the system when the engine is at rest. Solenoid 142 is de-energized, atmospheric pressure exists on both sides of diaphragm 131, and fly weights 159 are retracted by governor spring 160 which is stronger than ratio spring 155. Ratio spring 155 is in turn stronger than diaphragm spring 140 to hold ring 114 and shifting lever 115 to the left in its rearmost position. This is the lowest speed, highest torque, position.

When the engine is started and allowed to idle, the reduced pressure in the engine manifold draws a partial vacuum in chamber 133, causing diaphragm spring 140, assisted by atmospheric pressure on the rear side of the diaphragm, to move shifting lever 115 and ring 114 forward to direct drive position against the force of spring 155, as shown in Figure 9. Governor spring 160 is preloaded sufficiently to resist compression by this additional force, and, since the fly weights 159 do not revolve when driven shaft 12 is not turning, the governor parts will remain in their original condition, but the whole governor is shifted forward bodily. For idling, the neutral valves 90 are moved forward by lever 124 to return the fluid pumped from chambers 38 to the fluid reservoir in housing 15.

If the car is started slowly by very gradually closing neutral valve 90, it may be brought into motion and operated at low speed in direct drive with the entire control mechanism remaining in its idle position shown in Figure 9. Thus, Figure 9 may be described as illustrating both the idle position and low speed direct drive position of the parts.

In starting with normal acceleration or in starting on an upgrade, the mechanism will return from its idling position shown in Figure 9 partially or entirely to its Figure 7 position. The first opening of the throttle concurrently with the loading of the engine by the closing of neutral valve 90 produces a temporary large increase in manifold pressure, causing the pressure in chamber 33 to rise almost to atmospheric pressure which exists at all times on the rear side of the diaphragm. This increase in pressure in chamber 33 assisting the ratio spring 155, while the governor weights are still in low speed position, is effective to compress diphragm spring 140 and move the shifting lever back to a low ratio position to obtain the necessary mechanical advantage for starting and accelerating the car. The relative spring forces may be selected and adjusted so that when the throttle is opened wide at low governor speed the shifting lever will move to its rearmost position, while, if the throttle is opened a lesser amount, the shifting lever will move to an intermediate position to select a transmission ratio suitable for the loading of the engine imposed by the operator. It will further be apparent that if such a start is made on a steep upgrade the driven shaft 12 will not attain sufficient speed to throw out the governor weights 159 against the retractive force of spring 160, the high manifold pressure will be maintained in the chamber 133 and the mechanism will remain in the starting position shown in Figure 7. It will stay in this position until the shaft 12 finally rotates fast enough to throw out the weights 159, or until the manifold pressure is reduced to assist spring 140 to return the ratio valve back to direct drive.

When the driven shaft 12 reaches a predetermined speed, the governor weights 159 move outwardly, drawing the plates 157 together and compressing the governor spring 160, as shown in Figure 8. As the governor plates 157 are drawn together, it is apparent that the distance between collar 154 and shifting ring 114 is reduced, thereby allowing the shifting lever to move forward to a higher speed ratio position with the same balance of forces existing between the opposing springs 140 and 155. At the same time, the attainment of a higher running speed operates to reduce the manifold pressure, thereby allowing diaphragm spring 140, assisted by atmospheric pressure on the rear side of the diaphragm, to move the diaphragm forward and oppose shaft spring 155 with greater force in a new position of balance, since the shaft spring now has reduced effective tension because of the compression of governor spring 160. The movement of the shifting lever 115 from its Figure 7 position to its Figure 8 position is, therefore, gradual and depends upon the rate of acceleration of the vehicle and the amount of throttle opening. The parts are proportioned and adjusted so that they will assume their Figure 8 position at a combination of car speeds and manifold pressures which have been determined to be adequate for the particular engine and the particular automobile, to deliver sufficient power in direct drive. Figure 8, then, represents the condition of the mechanism under normal conditions corresponding to so-called high gear or direct drive operation with a gear transmission.

If the throttle is substantially closed and the speed reduced to about the idling speed of the engine, the mechanism will move from its Figure 8 position to the Figure 9 position, remaining in direct drive, unless the load reduces the speed of the engine to a point where the manifold pressure increases sufficiently to move the diaphragm 131 rearwardly. Then, if the throttle is opened to accelerate, the parts will return to the Figure 7 position until normal direct drive speed is attained again.

In ascending a steep hill, the diaphragm spring 140 holds the transmission in direct drive, regardless of increase of manifold pressure communicated to chamber 133, until the governor slows down sufficiently to assume a lower speed position. Then, as the governor slows down, the increasing separation of the plates 157 under the expansion of spring 160 moves the shifting lever 115 gradually rearwardly until a driving ratio is reached where the engine can carry the load without further slowing of the governor. This action may be controlled to a considerable extent by the manipulation of the throttle. If the throttle is opened wider while the governor is slowing down, the increase of manifold pressure in chamber 133 will then move the shifting lever sooner, or faster if it has already started to move. In any event, the desired result will be accomplished.

When the vehicle is traveling at a speed above that necessary to hold the governor in high speed position, as in Figure 8, the diaphragm spring 140 will continue to hold the shifting lever in its forward direct drive position even though the throttle is opened wide to accelerate quickly to a still higher speed. In such condition the increase of manifold pressure in chamber 133 is insufficient acting in conjunction with ratio spring 155 to compress the diaphragm spring 140 and move the shifting arm to a lower ratio position. Auxiliary means are, therefore, provided to enable the operator to shift to a lower driving ratio whenever it may be necessary, in an emergency, even at speeds which would normally call for direct drive. In the present embodiment, this is accomplished by pressing the foot throttle 144 to the floor to close switch 143, energizing solenoid 142. The solenoid then exerts sufficient pull on armature 141 to pull the diaphragm 131 back to a predetermined intermediate position as shown in Figure 10. As long as the switch 143 is held closed, the ratio valves 70 will be held in an intermediate position to produce the effect in a gear transmission of shifting back to second gear. The solenoid is made to have a pull which may be overcome to return the parts to direct drive after the engine has accelerated sufficiently to establish a fairly high vacuum condition in the diaphragm chamber. This feature is particularly useful in acquiring rapid acceleration to pass other vehicles and to relieve the laboring of the engine on a long hill before it has slowed down sufficienty to shift automatically. Upon opening the switch 143, the mechanism immediately returns from its Figure 10 position to its Figure 8 position.

Provision has also been made to meet another contingency where conventional fluid transmissions perform unsatisfactorily. On a slippery road surface, an automatic transmission may have difficulty in starting the vehicle, because as soon as one rear wheel starts to spin the transmission proceeds to shift to direct drive, which aggravates the situation by making the slipping wheel spin faster without obtaining traction on the roadway. To relieve this situation the present control mechanism provides means under the control of the operator for preventing the normal shifting of the transmission into direct drive in response to the speed of the shaft 12. By closing a manual switch, not shown, to energize solenoid 150 (Figure 1), the valve 146 is moved to the rear to close the vacuum line 134 to the engine and vent chamber 133 to atmosphere through slot 152. This maintains the condition shown in Figure 7 as long as the throttle is not opened wide, permitting the wheels to be turned slowly and positively at a definite speed, without tending to race when they slip on the roadway. This feature is useful on icy pavement and slippery mud where positive control of the driving wheels is advantageous.

If desired, solenoid 150 may also be energized by throttle switch 143 to admit full atmospheric pressure in chamber 133 when solenoid 142 is energized in the type of situation described in connection with Figure 10. This will reduce the operating force required to be developed by solenoid 142.

The transmission and control mechanism of Figure 1 provides three definite ratio speeds and direct drive, with smooth change therebetween obtained by throttling action when the ratio valves 70 are moved across the ports. A greater or lesser number of definite ratio speeds may be provided by varying the number of sets of motor chambers and reaction members, and the transition characteristics may be changed by modifying the shapes of the piston elements on valves 70 which are herein shown for convenience as cylindrical with flat ends.

The present transmission does not provide for reversal of the driven shaft 12. It is preferred to run the driven shaft 12 into a small gear box for this purpose, which may be controlled by a manual lever movable between forward, neutral and reverse positions.

*The embodiment of Figures 11 and 12*

Figures 11 and 12 illustrate a modification in which the innermost member is the driving member and the intermediate member is the driven member. The driving shaft is indicated at 200 and the driven shaft at 201. Just ahead of the transmission is a stationary plate or frame member 202 having a sleeve bearing 203 to support both the shaft 200 and one hub 204 of a rotatable cylindrical housing 205 which forms the oil reservoir for the transmission. Housing 205 has a rear hub 206 supported by a sleeve bearing 207 extending from a stationary frame member 208 whereby the sleeve 207 supports both the housing and shaft 201 on this frame member. All the rotatable parts turn in the direction of arrow 209 in Figure 12.

Keyed to driving shaft 200 is a rotor or driving member 210 having a plurality of forwardly inclined slots 211 for blades 212. Means for extending and retracting these blades will presently be described. Between the blades are slots containing resilient sealing members 51 of the type shown in Figure 5.

The driven shaft 201 is integrally connected with a driven member 215 having cavities defining three pump chambers 216 around the driving rotor 210. Between the chambers 216 are three partitions or fluid abutments 217, each having an arcuate curvature to provide a running fit with the cylindrical periphery of rotor 210. When the rotor 210 turns in the direction of arrow 209 relative to the driven member 215, fluid is drawn into the three pump chambers 216 through inlet ports 218 in the driven member, and discharged through outlet ports 219 under the control of ratio valves 220.

Each ratio valve 220 is a balanced piston type valve slidable longitudinally in a cylindrical bore 221 by movement of an actuating ring 222 as shown in Figure 13. Each valve 220 is arranged to uncover three ports 223, 224 and 225 as the valve is moved rearwardly or to the left in Figures 11 and 13, these three ports being closed when the valve is in the position shown. Adjacent each cylindrical bore 221 and communicating therewith by a common port 226 is a parallel cylinder or bore 227 containing a balanced neutral valve 228. Each valve 228 is equipped with a spring 229 to urge it rearwardly to a closed position, as shown, and these valves are all connected with a common actuating ring 230.

It will thus be apparent that when the driving member 210 is rotated with ratio valves 220 in the positions illustrated, fluid from the pump chambers 216 cannot escape through discharge ports 219, and so driven member 215 is then compelled to rotate with the driving member by the torque transmitted through the medium of the hydraulic fluid to produce, in effect, a direct driving connection between driving shaft 200 and driven shaft 201. When neutral valve 228 is moved forward, it uncovers a port 231 in a longitudinal discharge passage 232 which is in open communication at its ends with the reservoir space within the outer housing 205. The liquid discharged through outlet ports 219 can then flow freely through ports 226 and 231 to permit free rotation of driving member 210 without exerting any torque on driven member 215. To establish a driving connection with the driven member, the neutral valve 228 must be closed as shown. The port 227a is a relief port for the escape of leakage fluid from the end of valve cylinder 227, so that the valve will move freely. This port does not enter into any function of the transmission.

The ports 223, 224 and 225 constitute inlet ports for the respective motor chambers 233, 234 and 235, as shown in Figure 13. Driven member 215 has cavities in its periphery to form these motor chambers when the driven member is positioned within three reaction members 243, 244 and 245. Thus, there are cavities forming three motor chambers 233 within reaction member 243, cavities forming three motor chambers 234 within reaction member 244, and cavities forming three motor chambers 235 within reaction member 245. Each of these reaction members is equipped with overrunning clutch dogs 100 engageable with housing 205 as shown in Figure 12 which permit the reaction member to turn in a forward direction relative to housing 205, but prevent relative rotation in the opposite direction. When there is no fluid pressure in the motor chambers the reaction members rotate with the driven member. Reverse rotation of housing 205 is prevented by similar one-way brake dogs 240 mounted on stationary frame member 202 and engageable with the hub 204 shown in Figure 11.

Driven member 215 is equipped with a plurality of resilient ring seals 246 to enter into sealing engagement with end walls 245 on the reaction members. The cross sectional shape of these seals is shown in detail in Figure 14, and Figure 15 is a perspective view of a portion of a seal straightened out. The seal has a flat bottom surface to seat in its slot and a top sealing surface to wipe the walls 247. The side walls of the seal have cavities 248 with surfaces exposed to the fluid pressure in motor chambers 233, 234 and 235 whereby the body of the seal is compressed by such pressure to raise the top sealing surface out of the slot. The seal relaxes when the pressure is removed from cavities 248.

Housed in individual recesses 249 in each reaction member are pivotal blades 250 urged into radial positions by springs 251. Each blade is mounted on a longitudinal pin 252 extending through the recess 249 between the side walls 247 of the reaction member. The reaction members 243 and 245 are similar to the reaction member 244 shown in Figure 12, but the axial length varies to provide different capacities in the different sets of motor chambers 233, 234 and 235. Between the cavities forming these pump chambers the driven member 215 is provided with three partitions or fluid abutments 255 in the region of each group of valves, which partitions have a cylindrical outer surface for a running fit within the reaction members.

Referring to Figure 12, fluid pumped from pump chambers 216 and discharged through ports 219 and 224 fills the motor chambers 234, causing the pressure to react against blades 250 to drive the driven member 215 forward. The motor chambers all discharge directly into the previously mentioned inlet ports 218 for the pump chambers 216. The details of motor chambers 233 and 235 are the same as motor chambers 234 shown in Figure 12. Additional inlet ports 256 in pump chambers 216 provide for drawing oil directly from the fluid reservoir in housing 205 as may be required to keep the pump chambers filled.

Thus, when ratio valve 220 is moved rearwardly in the direction of arrow 257 in Figure 13 to uncover only the port 223, the entire capacity of the three pump chambers 216 is delivered into the three motor chambers 233, causing the driven member 215 to rotate slower than driving member 210. When the port 223 is wide open the speed ratio is in accordance with the relative displacement of the motor and pump chambers and the torque ratio depends upon the torque increase produced by the fluid pressure acting on the additional piston area exposed to the pressure in chambers 233. The opening of the motor chambers does not change the one-to-one torque ratio always existing between the driving and driven members in the pump chambers. When the ratio valve 220 is moved farther to bring the motor chambers 234 into operation, a lower speed ratio and higher torque ratio is obtained, and when the valve is moved to its rearmost position to bring all the motor chambers into operation, the lowest speed ratio with the greatest torque multiplication is obtained, because then the output of the three pump chambers 216 is divided between the nine motor chambers in order to drive the driven member 215 forward. Between these definite ratios the change is smooth through ranges of transition ratios as in the embodiment of Figures 1 and 2.

Referring now to Figure 11, actuating ring 222 for the ratio valve 220 is connected with a cross bar 260 on the forward end of a rod 261 extending through the hollow shaft 201. The rear end of this rod is connected to a cross head 112 on a shifting ring 113. The driving ratio of the transmission is controlled automatically by the speed of the driven shaft and manifold pressure in conjunction with auxiliary devices, as explained in connection with Figure 1. Corresponding parts in the control system of Figure 11 are identified by the same reference numerals used in Figure 1.

The actuating plate 230 for the neutral valve is moved forwardly in the direction of arrow 258 in Figure 13 by a ring 265 on the inner end of three pins 266 extending forward from a spider 267 on the hub 206 of the housing. The spider is equipped with a rotatable ring 268 engageable by the yoke on the lower end of the manual shifting fork 124 to move it longitudinally.

Means will now be described for extending and retracting the rotor blades 212 of driving member 210 by operation of fluid pressure in a novel manner to reduce friction and control the blades. Mounted on driving shaft 200, just within the front end wall of housing 205, is an eccentric or cam 269 extending over one hub of driven member 215 and arranged to operate a plurality of auxiliary pump units 270 on the driven member. Referring now to Figures 18, 19 and 20, each pump 270 has a pump cylinder 271 containing a piston 272. The piston is urged into engagement with cam 269 by a spring 273 seated in a small chamber 274 at the inner end of cylinder 271. Chamber 274 is adjacent a longitudinal valve cylinder 275 containing a balanced piston valve 276, the chamber and valve cylinder being interconnected at different points by three ports 277, 278 and 279.

When piston valve 276 is in its forward position illustrated in Figures 18 and 19, ports 277 and 279 are closed and port 278 is open to connect the chamber 274 with a passage 280 leading to one of the transmission pump chambers 216. Ball check valve 281 permits one way flow in passage 280 for drawing fluid from the pump chamber 216 when pump piston 272 moves outwardly in its cylinder. When pump piston 272 is moved inwardly by the cam 269, fluid is displaced from chamber 274 through passage 282 communicating with an annular channel 283 at the forward end of the driving member rotor 210. Ball check valve 284 prevents return flow through this passage. On the rear side of driven rotor 210 is another annular channel 285, both of these channels communicating with the bottoms of all the blade slots 211 around the rotor, as shown in Figure 11. A passage 286 containing a ball check valve 287 connects the annular channel 285 with the rear side of the pump chamber 216 which is in communication with the suction passage 280. Thus the fluid pumped by piston 272 through passage 282 is forced into the bottoms of the blade slots to extend the blades 212 when valve 276 is in its forward position. The spring tension on ball check valve 287 is adjusted to maintain a slightly higher pressure in the bottoms of the blade slots 211 than exists in the pump chambers 216, so that, regardless of wide variations of fluid pressure in pump chambers 216, the same pressure differential is maintained to extend the blades. This arrangement insures that the blades will be extended, no matter how high the pressure in pump chambers 216 may rise, and automatically reduces the pressure under the blades when the pressure in pump chambers 216 falls to a low value, to avoid unnecessary friction on the ends of the blades.

When piston valve 276 is moved to its rear position, as shown in Figure 20, suction passage 280 is closed and a passage 288 leading to the annular channel 283 is connected with port 277. Passage 288 contains a ball check valve 289 to permit suction through this passage for the pump piston 272 while preventing discharge through the passage. In the rear position of piston valve 276, port 279 is connected with a discharge passage 290 communicating with the reservoir space in housing 205. The discharge passage includes a ball check valve 291.

Thus, when piston valve 276 is in the rear position shown in Figure 20, the pump piston 272 operates to withdraw fluid from the bottoms of blade slots 211, creating a vacuum condition under the blades to hold them fully retracted in the bottoms of their slots so they will not drag against driven member 215. With the blades retracted in this manner, mechanical wear is eliminated, and the pumping action of driving rotor 210 is suspended to place the transmission in neutral independently of valve 228 in Figure 13.

Each piston valve 276 is normally held in its forward position by a spring 292. The valves 276 for the several auxiliary pumps 270 have actuating stems extending out through the pump housings 270 for engagement by an actuating ring 292 carried by sliding pins 293 in housing 205, as shown in Figures 11 and 18. The forward ends of pins 293 are engaged by a ring 294 carried by the plungers or armatures 295 of a plurality of solenoids 296 mounted on frame member 202.

When the transmission is in normal driving operation, the solenoids 296 are deenergized, and there is a slight clearance between the actuating rings and pins just described. When solenoids 296 are energized, the plungers 295 carrying the ring 294 are extended rearwardly to push the inner actuating ring 292 against the stems of piston valves 276 to move these valves to blade retracting position as shown in Figure 20.

In Figure 11 the diaphragm 131 and governor 156 are shown in idling position, as in Figure 9. This position may also be assumed in direct drive at very low speeds under light load with the throttle closed substantially to idling position. Figure 16 shows the governor and shifting lever 115 in direct drive position at normal speed as described in connection with the diagram in Figure 8.

Figure 17 corresponds to diagrammatic Figure 10, in which the shifting lever is pulled rearwardly by the action of solenoid 142 for an emergency or temporary lower ratio drive, notwithstanding the fact that the governor weights are thrown out to their high speed position and that a partial vacuum condition exists in diaphragm chamber 133. As explained in connection with Figure 10, the position shown in Figure 17 is maintained only so long as switch 143 in Figure 1 is held closed by the throttle pedal 144, and until the engine has accelerated sufficiently to establish a predetermined vacuum condition in the diaphragm chamber.

Figure 22:
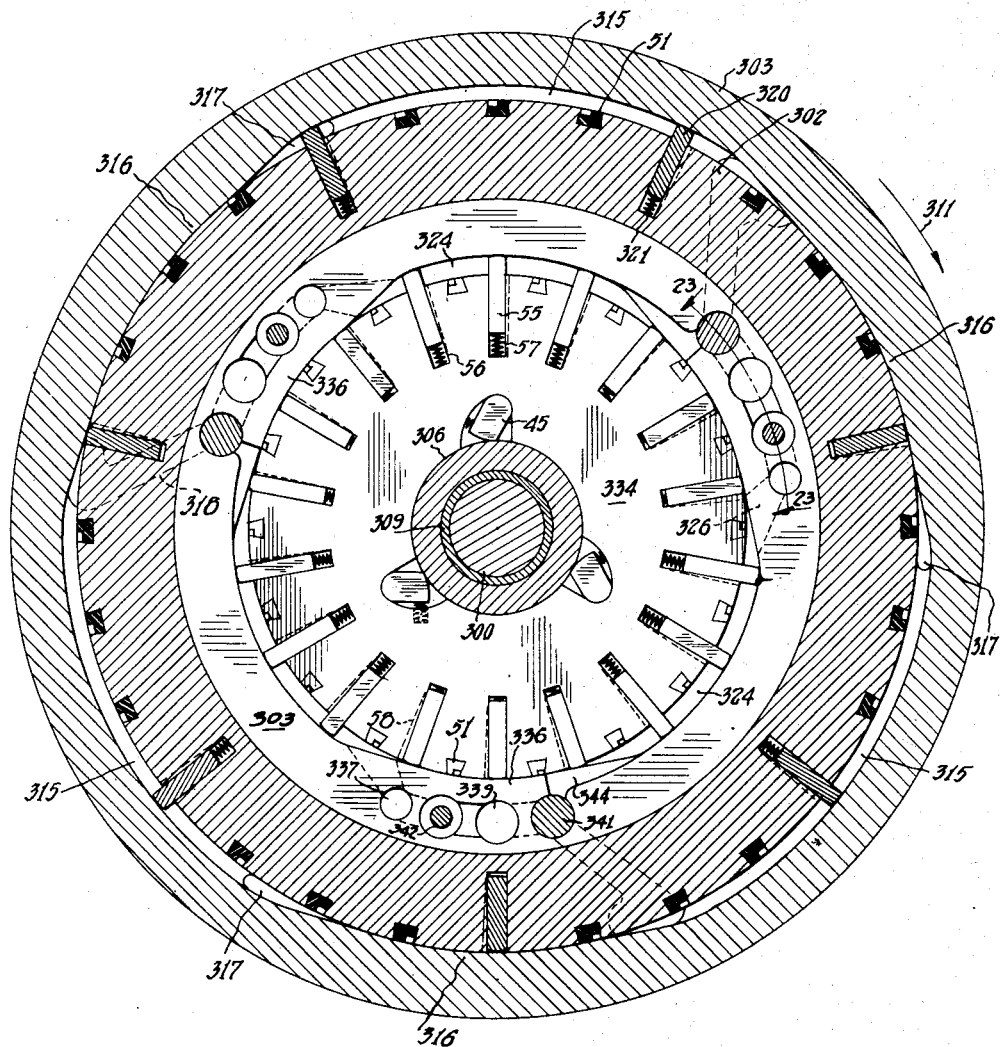
Figure 22 is a cross sectional view taken on the line 22—22 of Figure 21.

*Embodiment of Figures 21 and 22*

A third embodiment of the invention is illustrated in Figures 21 to 23 for transmitting power from a driving shaft 300 to a driven shaft 301 in different speed and torque ratios. Here the driven member is outermost and the intermediate member is the driving member. The driving shaft carries a driving member 302 keyed thereto for rotation between two parts of a driven member 303 which is integral with the driven shaft. Driven member 303 constitutes a cylindrical housing for the transmission and a reservoir for the transmission fluid. The driven shaft and driven member are supported in a bearing 304 in a stationary frame member 305 at the rear end of the transmission. Other parts of the transmission are supported by a tube or sleeve 306 mounted on a frame member 307 at the front end of the transmission. Driven member housing 303 has a hub 308 on its front end supported on the outside of sleeve 306, and driving shaft 300 is supported in a bearing 309 within the sleeve 306. The rear end of driving shaft 300 is further supported and maintained in alignment with the driven shaft by a pilot bearing 310. The rotating members all turn in the direction of arrow 311 in Figure 22.

The outer part of driven member 303 is provided with three cavities forming pump chambers 315 symmetrically distributed around the housing and separated by partitions 316 forming fluid pressure abutment between the chambers. The partitions 316 have cylindrical inner surfaces with a running fit on the driving rotor 302. Pump chambers 315 are provided with inlet ports 317 to draw fluid from the reservoir chamber within the housing 303, and outlet ports 318 leading to valve chambers.

Driving member 302 comprises a slotted rotor having blades 320 urged outwardly against the surrounding housing of driven member 303 by springs 321. For convenience in illustration, outlet ports 318 are shown in Figure 22 at the opposite ends of the pump chambers 315 from the inlet ports 317. Upon relative rotation of the driving rotor 302 within the driven member 303, which forms in effect a pump casing therefor, the fluid drawn in through each port 317 is swept through chamber 315 and out of the outlet port 318.

Driven member 303 has radial walls 322, as shown in Figure 21, defining three sets of motor or reaction chambers 323, 324, and 325 in an inner part of the driven member. These three sets of chambers contain three reaction members 333, 334 and 335. Each reaction member is equipped with overrunning brake dogs 45, as in Figure 2, engageable with stationary sleeve 306 to permit forward rotation of the reaction member and prevent reverse rotation. Each reaction member is also equipped with blades 55 urged outwardly by springs 57 to sweep the motor chambers, as shown in Figure 22 in the case of central motor chambers 324. Between the blades 55 are seals 51. The blade slots 56 are also equipped with grooves 58 to introduce the fluid pressure to the bottoms of the blade slots, as explained in connection with Figure 2. The motor chambers, such as chambers 324, are formed by cavities in the inner part of drive member 303, shown in elevation in Figure 22 between driving member 302 and reaction member 334. Between these cavities are partitions 336 with a cylindrical curvature to have a running fit around the three reaction members.

In the region of each partition 336 in drive member 303 there is a valve assembly as shown in Figure 23. Each valve assembly comprises four longitudinal bores or passages 337, 338, 339 and 340 in the inner part of driven member 303. The bore 340 constitutes a cylinder for a balanced piston valve 341, and the bore 338 constitutes a cylinder for a balanced piston valve 342, the former being the ratio valve and the latter being the neutral valve to function in general as in the previous embodiments.

The bore 339 constitutes a fluid pressure chamber which is always in communication with the outlet passage 318 of an adjacent pump chamber 315. When the ratio and neutral valves 341 and 342 are in the forward positions illustrated, there is no escape of fluid from chamber 339 and valve cylinder 349, and so driven member 303 is constrained to rotate with driving member 302 to establish, in effect, a direct driving connection between the driving and driven shafts. The reaction members then rotate with the driven member.

The motor chambers 323, 324 and 325 are connected by the respective ports 343, 344 and 345 with the ratio valve cylinder 349, and this cylinder is in turn connected with pressure chamber 339 by the two ports 346 and 347. Thus, as the ratio valve piston 341 is moved to the rear, first the port 343 and then the port 344 is opened to admit fluid from the pump chambers 315 into the motor chambers 323 and 324 to apply additional torque to the driven member in accordance with the pressure and piston areas in the motor chambers. Further movement of ratio valve 341 to its rearmost position places port 345 in communication with port 347 to admit fluid also to the third set of motor chambers 325. The motor chambers discharge through open outlet ports 326. The speed and mechanical advantage of driven member 303 with respect to driving member 302 thereby depend upon the position of ratio valve 341 which controls the number of motor chambers to be opened to receive the output of the pump chambers. When the ratio valve 341 is in its rearmost position, all nine motor chambers are opened to receive the pump output, and the transmission is in its lowest speed and highest torque ratio drive. As the ratio valve moves across the ports it exerts a throttling action controlling the motor chamber pressure to produce a smooth change in the speed and torque ratios throughout the whole range of the transmission. Regardless of the additional torque obtained from the motor chambers the full value of the input torque is always transmitted directly to the driven member in the pump chambers.

The longitudinal bore or passage 337 is open at its ends into the fluid reservoir within housing 303. A port 348 connects this passage with valve cylinder 338, and another port 348 connects cylinder 338 with pressure chamber 339. Thus, when neutral valve 342 is moved to the rear, these two ports are brought into communication so that fluid delivered to chamber 339 from the pump chambers 315 is passed back to the fluid reservoir without going through the motor chambers and without developing a pressure in the pump chambers. This establishes a neutral for the transmission in which driving member 302 may rotate within driven member 303 without transmitting torque to the latter.

Ratio valves 341 are connected with an actuating ring 350, and neutral valves 342 are connected with an actuating ring 351. The parts are shown in their forward or direct drive position in Figures 21 and 23, the rearward motions of the parts hereinabove referred to being in the direction of arrow 352 which applies to both valves.

The actuating ring 350 for the ratio valves may be pressed rearwardly by a series of pins 354 carried by an external actuating ring 355. The actuating ring 351 for the neutral valves carries a series of pins 356 extending out through the housing 303 for actuation by a second external ring, not shown. These actuating rings may be operated by manual or automatic mechanism as shown in the first two embodiments or in any other suitable manner, as will be readily understood by persons skilled in the art.

When one or more of the ports 343, 344, or 345 is closed, the corresponding reaction members 333, 334 or 335 are free to rotate in a forward direction with driving member 302 to prevent unnecessary friction on the reaction member blades and motor chambers, and also to relieve the vacuum drag on the driven members. As soon as one of these inlet ports is opened by ratio valve 341, the fluid reaction in the activated motor chambers holds that reaction member stationary against its one-way brake dogs 45 as an abutment and exerts a driving torque upon the inner part of the driven member. Thus there is relative motion between the reaction members and the driving member only when a ratio lower than direct drive is called for, and then only in the case of those reaction members which are in activated pump chambers.

A common advantage of all the illustrated embodiments of the invention is that in direct drive no fluid is pumped and there is no relative movement of the parts to cause losses or wear. In any lower ratio drive, the rate of fluid pumping is proportional to the torque increase demanded of the transmission, rather than the total output torque since the full input torque is applied directly to the driven member. Fluid friction losses affect the operating efficiency of the transmission only in those intervals when direct drive will not satisfactorily carry the load. At such times the losses, also, are a function of the torque increase rather than the total output torque, because of the direct application of input torque to the driven member. The transmission responds to an increase in torque demand by pumping enough fluid to produce the additional torque without changing the constant effectiveness of the one-to-one torque ratio drive through the medium of the fluid interposed between the driving and driven members in the pump chambers. To supply the additional torque there must be relative movement between the driving and driven members, which requires either the driving member to speed up, or the driven member to slow down. The only fluid friction losses are those involved in the pumping of the fluid to produce this additional torque over the one-to-one ratio value which is transmitted directly by the fluid pressure in the pump chambers.

The use of three pump chambers and three motor or reaction chambers distributed symmetrically around the shafts makes the device more compact, hydraulically balances the working parts and reduces the working pressure of the fluid to one-third the pressure that would be required to transmit the same torque in a single working chamber of the same size.

Having now described my invention and in what manner the same may be used, what I claim as new and desire to protect by Letters Patent is:

1. A fluid transmission comprising a driving member, a driven member and a plurality of reaction members all mounted for concentric rotation in one direction, said driving and driven members co-operating with each other to form pump chambers therebetween, one of said first two members additionally co-operating with said reaction members to form motor chambers, overrunning brake means operative on said reaction members individually to prevent reverse rotation of said reaction members, and fluid passages and valves to control a flow of fluid from said pump chambers to a variable number of said motor chambers.

2. A fluid transmission comprising a driving member and a driven member cooperating with each other to form pump chambers therebetween, a plurality of reaction members mounted for individual rotation in the direction of rotation of said driving member and all cooperating with one of said first mentioned members to form motor chambers between each reaction member and said other member, overrunning brake means operative on said reaction members individually to prevent reverse rotation of said reaction members, and fluid passages and valves to control a flow of fluid from said pump chambers to said motor chambers.

3. A fluid transmission comprising concentric driving, driven and reaction members, there being a plurality of said reaction members arranged in end to end relation and mounted for individual rotation in the direction of rotation of said driving member, overrunning brake means operative on said reaction members individually to prevent reverse rotation of said reaction members, said driven member being disposed between said driving and reaction members, said driven member cooperating on one side with said driving member to form pump chambers therebetween and cooperating on its other side with said reaction members to form motor chambers, and fluid passages and valves to control a flow of fluid from said pump chambers to said motor chambers.

4. A fluid transmission comprising an annular driven member, said driven member having inner and outer peripheral working portions, a concentric driving member cooperating with one of said peripheral portions to form pump chambers between said driving and driven members, and a plurality of reaction members concentric with said driving and driven members and cooperating with the other peripheral working portion of said driven member to form a plurality of motor chambers, said reaction members being arranged in end to end relation and mounted for individual rotation in the direction of rotation of said driving member, overrunning brake means operative on said reaction members individually to prevent reverse rotation of said reaction members, and fluid passages and valves to control a flow of fluid from said pump chambers to said motor chambers.

5. A fluid transmission comprising a driving member, a driven member cooperating with said driving member to form a positive displacement pump, a plurality of reaction members cooperating with said driven member to form positive displacement motor chambers, said members being concentric, said reaction members being mounted for individual forward rotation and equipped with an overrunning brake to prevent reverse rotation, and fluid passages and valves to control a flow of fluid from said pump to a variable number of said motor chambers.

6. A fluid transmission comprising a driving member, a driven member cooperating with said driving member to form pump chambers between said members for transmitting torque directly to the driven member in accordance with the fluid pressure in said chambers, a plurality of individually rotatable reaction members cooperating with said driven member to form motor chambers between said members for transmitting additional torque to said driven member in accordance with the fluid pressure in the motor chambers, passages for delivering fluid from said pump chambers to said motor chambers, a valve in said passages operable in one position to prevent discharge of fluid from said pump chambers and operable in other positions to admit fluid to a selected number of said motor chambers, and overrunning brake means operable on said reaction members individually to provide an abutment against reverse rotation of the reaction members.

7. A fluid transmission comprising a driving member, a driven member and a plurality of individually rotatable reaction members, said driven member forming with said driving member a fluid pump, and said driven member forming with each of said reaction members a separate fluid motor to receive fluid from said pump, valve means to control the number of said motors receiving fluid from said pump, and overrunning brake means operable on each reaction member to permit rotation of the reaction members with the driven member and to prevent reverse rotation of the reaction members.

8. A fluid transmission comprising rotatable driving, driven and reaction members, there being one driving member, one driven member and a plurality of reaction members, said driving and driven members forming a fluid pump, and each of said reaction members forming with said driven member a separate fluid motor for said driven member, means to direct fluid from said pump selectively into one or more of said motors and to shut off discharge from said pump to lock the driven member to the driving member, said reaction members being individually rotatable in the direction of rotation of the driving member, and individual means to prevent reverse rotation of each of said reaction members.

9. A fluid transmission comprising rotatable concentric driving, driven and reaction members, there being one driving member, one driven member, and a plurality of reaction members individually rotatable in the direction of rotation of said driving member, pump chambers between said driving and driven members, separate motor chambers between said driven member and each of said reaction members, overrunning brake means operative on each of said reaction members to prevent reverse rotation of the reaction members, and a ratio control valve to admit fluid discharged from said pump chambers into selected ones of the motor chambers.

10. A fluid transmission comprising balanced rotatable concentric driving, driven and reaction members, there being one driving member, one driven member and a plurality of reaction members, the outermost of said members constituting a fluid housing and reservoir for the transmission, said driving and driven members constituting a fluid pump, said driven member co-operating with said reaction members to form a plurality of fluid motors, outlet passages in said pump, inlet passages in said motors, valve means for controlling the flow of fluid through said passages between said pump and motors to supply a variable number of said motors, and means including valves and passages for diverting fluid discharged from said pump into said reservoir to relieve the pump pressure.

11. A fluid transmission comprising a driving member, a driven member and a plurality of reaction members, all in concentric relation, said driving and driven members forming a fluid pump, said driven and reaction members forming a plurality of fluid motors, passages and valves for admitting fluid from said pump into a variable number of said motors, said reaction members being mounted for individual forward rotation, and overrunning brake means operative on said reaction members individually to prevent reverse rotation of the reaction members.

12. A fluid transmission comprising three concentric rotatable members, the outer member constituting a driving member and fluid reservoir for the transmission, the inner member constituting a reaction member, and the intermediate member constituting the driven member, said driving and driven members forming a fluid pump and said driven and reaction members forming a fluid motor receiving fluid from said pump, and valve means to control the flow of fluid from said pump to said motor.

13. A fluid transmission having a plurality of concentric rotatable members comprising a driving member, a driven member, and a plurality of reaction members of uniform diameter disposed in end to end relation in an axial direction, the outermost of said members constituting a fluid reservoir and housing enclosing the other members, pump chambers for a positive displacement pump between said driving and driven members, motor chambers for a positive displacement motor between said driven and reaction members, outlet passages in said pump chambers connected with inlet passages in said motor chambers, and valves in said passages for admitting fluid from said pump chambers to a variable number of said motor chambers, said valves being effective when closed to lock the driven member to the driving member in direct drive with all of said members rotating as a unit.

14. A fluid transmission comprising a driving member constituting an outer housing and fluid reservoir for the transmission, a driven member within said outer housing and cooperating therewith to form a fluid pump, and a plurality of rotatable reaction members within said driven member and cooperating therewith to form a plurality of fluid motor units, overrunning brake means operative on each reaction member to prevent reverse rotation of the reaction members, a ratio valve for admitting fluid from said pump to a selected number of said motor units, and a by-pass valve to return the pump discharge back to said fluid reservoir.

15. A fluid transmission comprising concentric driving, driven and reaction members, said driving member being the outermost member and constituting a housing and fluid reservoir for the transmission, said driven member being the intermediate member, said driving and driven members constituting a fluid pump having inlet ports in said reservoir adjacent the periphery of said housing, said reaction member being the central one of said members, said driven member and reaction member constituting a fluid motor having inlet ports connected with outlet ports of the pump, and overrunning brake means operative on said reaction member to permit free rotation of the reaction member in the direction of the driving member and to prevent reverse rotation of the reaction member.

16. A fluid transmission comprising rotatable concentric driving, driven and reaction members, the outermost member constituting the driving member and a housing and fluid reservoir for the transmission fluid, the intermediate member constituting the driven member, there being a plurality of innermost members constituting separate reaction members, a stationary concentric sleeve extending into said housing and through the center of said reaction members to support said reaction members, overrunning brake dogs in each of said reaction members to prevent reverse rotation of the reaction members on said sleeve, a driven shaft extending through said stationary sleeve and connected with said driven member, a series of pump chambers between said driving and driven members, a series of motor chambers between each of said reaction members and the driven member, and a ratio valve controlling the delivery of fluid from said pump chambers to a selected number of said motor chambers.

17. A fluid transmission comprising concentric rotatable driving, driven and reaction members, there being one driving member, one driven member, and a plurality of reaction members, said driving and driven members cooperating with each other to form pump chambers therebetween, said reaction members cooperating with one of said first two members to form motor chambers between each reaction member and said other member, said motor chambers being arranged to receive fluid from each of said pump chambers, a ratio valve for each pump chamber to deliver fluid from the pump chamber to a selected number of motor chambers, a by-pass valve for each pump chamber for the relief of fluid from the pump chambers, an actuating plate connected with all of said ratio valves, an actuating plate connected with all of said by-pass valves, and means extending exteriorly of the transmission for moving said actuating plates to control the operation of the transmission.

DANIEL F. McGILL.

References Cited in the file of this patent

UNITED STATES PATENTS

| Number | Name | Date |
| --- | --- | --- |
| 1,444,712 | Smith | Feb. 6, 1923 |
| 1,469,269 | Rose | Oct. 2, 1923 |
| 1,497,741 | Schneider | June 17, 1924 |
| 1,503,618 | Wingquist | Aug. 5, 1924 |
| 1,604,321 | Schneider | Oct. 26, 1926 |
| 1,779,757 | Streckert | Oct. 28, 1930 |
| 1,797,439 | Napier | Mar. 24, 1931 |
| 1,825,435 | Wingquist | Sept. 29, 1931 |
| 1,870,824 | Shepard | Aug. 9, 1932 |
| 1,986,041 | Bullock | Jan. 1, 1935 |
| 2,021,574 | Cottrell | Nov. 19, 1935 |
| 2,049,092 | Sturm | July 28, 1936 |
| 2,198,891 | Thoma | Apr. 30, 1940 |
| 2,330,565 | Eckart | Sept. 28, 1943 |
| 2,337,499 | Roth | Dec. 21, 1943 |
| 2,359,423 | Johnson | Oct. 3, 1944 |
| 2,380,819 | Allbaugh | July 31, 1945 |
| 2,393,882 | Blair | Jan. 29, 1946 |
| 2,434,546 | Breedlove | Jan. 13, 1948 |
| 2,443,074 | Kraft | June 8, 1948 |
| 2,481,012 | Haseltine | Sept. 6, 1949 |
| 2,589,362 | Foster | Mar. 18, 1952 |